US012089282B2

(12) United States Patent
Van Phan et al.

(10) Patent No.: US 12,089,282 B2
(45) Date of Patent: Sep. 10, 2024

(54) METHOD, APPARATUS AND COMPUTER PROGRAM PRODUCT FOR MANAGEMENT OF SIDELINK DISCONTINUOUS RECEPTION

(71) Applicant: Nokia Technologies Oy, Espoo (FI)

(72) Inventors: Vinh Van Phan, Oulu (FI); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/182,558

(22) Filed: Feb. 23, 2021

(65) Prior Publication Data
US 2021/0267009 A1    Aug. 26, 2021

(30) Foreign Application Priority Data
Feb. 24, 2020   (WO) ................. PCT/EP2020/054784

(51) Int. Cl.
*H04W 76/28*    (2018.01)
*H04W 92/18*    (2009.01)

(52) U.S. Cl.
CPC ............ *H04W 76/28* (2018.02); *H04W 92/18* (2013.01)

(58) Field of Classification Search
CPC .............................. H04W 76/28; H04W 92/18
See application file for complete search history.

(56) References Cited

U.S. PATENT DOCUMENTS

| 10,624,101 B2* | 4/2020 | Lu ........................ H04W 72/042 |
| 2007/0291673 A1* | 12/2007 | Demirhan ......... H04W 52/0216 370/311 |
| 2012/0082192 A1* | 4/2012 | Pelletier ................ H04L 5/0051 375/219 |

(Continued)

FOREIGN PATENT DOCUMENTS

| CN | 104871635 A | 8/2015 |
| WO | 2014/092612 A1 | 6/2014 |

(Continued)

OTHER PUBLICATIONS

"New WID on NR Sidelink Enhancement", 3GPP TSG RAN Meeting #86, RP-193231, Agenda: 9.1.1, LG Electronics, Dec. 9-12, 2019, 6 pages.

(Continued)

*Primary Examiner* — Parth Patel
(74) *Attorney, Agent, or Firm* — Robert P. Michal, Esq.; Carter, DeLuca & Farrell LLP (57) ABSTRACT

There is disclosed methods, apparatuses and computer program products for configuring a discontinuous reception pattern for a receiver of a wireless communication device. In accordance with an embodiment, the method comprises obtaining two or more discontinuous reception patterns for a wireless communication device to be used in sidelink communication with one or more user devices; selecting at least one discontinuous reception pattern from the two or more discontinuous reception patterns for the wireless communication device; and receiving signals from the one or more other devices and/or transmitting signals to the one or more other devices for the sidelink communication according to the selected at least one discontinuous reception pattern.

10 Claims, 4 Drawing Sheets

(56) References Cited

U.S. PATENT DOCUMENTS

| | | | |
|---|---|---|---|
| 2013/0044674 A1* | 2/2013 | Teyeb | H04W 52/0216 |
| | | | 370/315 |
| 2013/0308511 A1* | 11/2013 | Ljung | H04W 52/0209 |
| | | | 370/311 |
| 2014/0056220 A1* | 2/2014 | Poitau | H04W 76/14 |
| | | | 370/328 |
| 2014/0086161 A1* | 3/2014 | Cai | H04W 56/0045 |
| | | | 370/329 |
| 2015/0055532 A1* | 2/2015 | Lu | H04W 76/14 |
| | | | 370/311 |
| 2015/0245295 A1 | 8/2015 | Jha et al. | |
| 2016/0044740 A1* | 2/2016 | Siomina | H04W 76/14 |
| | | | 455/552.1 |
| 2016/0360541 A1* | 12/2016 | Kim | H04W 72/0413 |
| 2017/0027013 A1* | 1/2017 | Kim | H04W 76/28 |
| 2017/0142741 A1* | 5/2017 | Kaur | H04W 76/19 |
| 2017/0251520 A1* | 8/2017 | Siomina | H04W 72/02 |
| 2017/0273137 A1* | 9/2017 | Wu | H04W 64/003 |
| 2017/0303215 A1* | 10/2017 | Kim | H04W 52/383 |
| 2017/0325167 A1* | 11/2017 | Lu | H04W 52/0235 |
| 2018/0027424 A1* | 1/2018 | Chen | H04W 24/02 |
| | | | 455/450 |
| 2018/0110088 A1* | 4/2018 | Zhu | H04W 76/16 |
| 2018/0249463 A1* | 8/2018 | Huang | H04W 56/0015 |
| 2020/0059915 A1* | 2/2020 | Lee | H04W 56/0015 |
| 2020/0267655 A1* | 8/2020 | Awoniyi-Oteri | |
| | | | H04W 52/0216 |
| 2021/0037468 A1* | 2/2021 | Huang | H04W 76/23 |
| 2021/0084660 A1* | 3/2021 | Taherzadeh Boroujeni | |
| | | | H04L 5/0057 |
| 2021/0219377 A1* | 7/2021 | Balasubramanian | |
| | | | H04W 76/28 |
| 2021/0227604 A1* | 7/2021 | Huang | H04W 72/02 |
| 2021/0227619 A1* | 7/2021 | Balasubramanian | |
| | | | H04W 76/28 |
| 2021/0227620 A1* | 7/2021 | Pan | H04L 1/1819 |
| 2021/0227621 A1* | 7/2021 | Pan | H04W 72/0446 |
| 2021/0267008 A1* | 8/2021 | Dutta | H04W 76/28 |
| 2021/0267009 A1* | 8/2021 | Van Phan | H04W 76/14 |
| 2021/0321329 A1* | 10/2021 | Tenny | H04W 76/28 |
| 2022/0191793 A1* | 6/2022 | Murray | H04W 72/23 |
| 2022/0232667 A1* | 7/2022 | Back | H04W 76/28 |
| 2022/0322486 A1* | 10/2022 | Park | H04W 76/14 |
| 2022/0418036 A1* | 12/2022 | Back | H04W 76/28 |

FOREIGN PATENT DOCUMENTS

| | | | |
|---|---|---|---|
| WO | 2015176251 A1 | 11/2015 | |
| WO | WO-2021071332 A1 * | 4/2021 | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V 16.0.0, Dec. 2019, pp. 1-101.

"3rd Generation Partnership Project; Technical Specification Group Radio Access Network;NR; Radio Resource Control (RRC) protocol specification(Release 15)", 3GPP TS 38.331, V15.8.0, Dec. 2019, pp. 1-532.

"3rd Generation Partnership Project; Technical Specification Group Radio Access Network; NR; Medium Access Control (MAC) protocol specification(Release 15)", 3GPP TS 38.321, V15.8.0, Dec. 2019, pp. 1-78.

"3rd Generation Partnership Project; Technical Specification Group Radio Access Network;NR; Physical layer; General description(Release 16)", 3GPP TS 38.201, V16.0.0, Dec. 2019, pp. 1-13.

"3rd Generation Partnership Project; Technical Specification Group Radio Access Network;NR; Physical layer procedures for control(Release 16)", 3GPP TS 38.213, V16.0.0, Dec. 2019, pp. 1-146.

International Search Report and Written Opinion received for corresponding Patent Cooperation Treaty Application No. PCT/EP2020/054784, dated Nov. 9, 2020, 12 pages.

Office Action issued by the China National Intellectual Property Administration in relation to Chinese Application No. 202080097432.2 dated Jul. 2, 2024 (9 pages) along with English language translation (7 pages).

Search Report issued by the China National Intellectual Property Administration in relation to Chinese Application No. 202080097432.2 dated Jun. 30, 2024 (3 pages).

«3GPP TSG RAN WG2 Meeting #95bis R2-166255», 第 TSGR2_95bis 期 Oct. 14, 2016; Intel Corporation, Discussion and decision.

《中国优秀硕士学位论文 文献数据库》第 09 期 朱叶青,蜂窝网络中高能 效的 D2D 辅助中继技术 研究 Translated via Google: "China Excellent Master's Degree Thesis Full-text Database", Issue 09 Zhu Yeqing, Research on Energy-efficient D2D-assisted Relay Technology in Cellular Networks.

«IEEE International Symposium on Personal, Indoor and Mobile Radio Communications» Sep. 11, 2013; Jongwoo Hong, Seungil Park, Hakseong Kim, Sunghyun Choi, Kwang Bok Lee, Analysis of Device-to-Device Discovery and Link Setup in LTE Networks.

* cited by examiner

METHOD, APPARATUS AND COMPUTER PROGRAM PRODUCT FOR MANAGEMENT OF SIDELINK DISCONTINUOUS RECEPTION

TECHNICAL FIELD

The present invention relates to management of sidelink discontinuous reception.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

3GPP has been developing standards for sidelink (SL) as a tool for direct communication between user equipment (UE to UE communication) in various use cases. In some use cases solutions including new radio (NR) sidelink are being specified mainly for vehicle-to-everything (V2X) while they can also be used for public safety when the service requirement can be met.

Some commercial use cases related to NR sidelink are, for example, network controlled interactive service (NCIS), gap analysis for railways, enhanced relays for energy efficiency and extensive coverage (REFEC), audio-visual service production (AVPROD).

Power saving may enable user equipment with battery constraint to perform sidelink operations in a more power efficient manner. A sidelink procedure has been designed based on the assumption of "always-on" when a user equipment operates sidelink, e.g., only focusing on user equipment installed in vehicles with sufficient battery capacity. Solutions for power saving may be needed for vulnerable road users (VRUs) in vehicle-to-everything use cases and for user equipment in public safety and commercial use cases where power consumption in the user equipment should be minimized.

Discontinuous reception (DRX) in sidelink for broadcast, groupcast, and unicast has been proposed in which on- and off-durations in sidelink have been defined and the corresponding procedure in the user equipment has been specified. Also a mechanism has been specified aiming to align sidelink DRX wake-up time among the user equipment communicating with each other and with a DRX wake-up time of a radio interface (Ua) between an access node (a.k.a. access point), such as an eNodeB, eNB, gNB, BS) and the user equipment in an in-coverage user equipment.

SUMMARY

There is provided a method, apparatus and computer program product for managing sidelink discontinuous reception (SL-DRX).

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a method for managing sidelink discontinous reception comprising:
  obtaining two or more discontinuous reception patterns for a wireless communication device to be used in sidelink communication with one or more user devices;
  selecting at least one discontinuous reception pattern from the two or more discontinuous reception patterns for the wireless communication device;
  receiving signals from the one or more other devices and/or transmitting signals to the one or more other devices for the sidelink communication according to the selected at least one discontinuous reception pattern.

According to a second aspect there is provided an apparatus, comprising means for:
  obtaining two or more discontinuous reception patterns for a wireless communication device to be used in sidelink communication with one or more user devices;
  selecting at least one discontinuous reception pattern from the two or more discontinuous reception patterns for the wireless communication device;
  receiving signals from the one or more other devices and/or transmitting signals to the one or more other devices for the sidelink communication according to the selected at least one discontinuous reception pattern.

According to a third aspect there is provided an apparatus comprising at least one processor; and at least one memory including computer program code; the at least one memory and the computer program code configured to, with the at least one processor, to cause the apparatus to:
  obtain two or more discontinuous reception patterns for a wireless communication device to be used in sidelink communication with one or more user devices;
  select at least one discontinuous reception pattern from the two or more discontinuous reception patterns for the wireless communication device;
  receive signals from the one or more other devices and/or transmit signals to the one or more other devices for the sidelink communication according to the selected at least one discontinuous reception pattern.

According to a fourth aspect there is provided an apparatus, comprising:
  a first circuitry configured to obtain two or more discontinuous reception patterns for a wireless communication device to be used in sidelink communication with one or more user devices;
  a second circuitry configured to select at least one discontinuous reception pattern from the two or more discontinuous reception patterns for the wireless communication device;
  a third circuitry configured to provide an indication of the selected at least one discontinuous reception pattern to one or more other wireless communication devices; and
  a third circuitry configured to receive signals from the one or more other devices and/or transmit signals to the one or more other devices for the sidelink communication according to the selected at least one discontinuous reception pattern.

According to a fifth aspect there is provided a computer program product comprising computer readable program code configured to, with at least one processor, cause an apparatus. to perform at least the following:

obtain two or more discontinuous reception patterns for a
wireless communication device to be used in sidelink
communication with one or more user devices;

select at least one discontinuous reception pattern from
the two or more discontinuous reception patterns for
the wireless communication device;

receive signals from the one or more other devices and/or
transmit signals to the one or more other devices for the
sidelink communication according to the selected at
least one discontinuous reception pattern.

According to a sixth aspect there is provided a method
comprising:

obtaining a set of discontinuous reception patterns and
rules for selecting a discontinuous reception pattern for
sidelink communication from a network control entity
or an operations and maintenance manager;

providing information of the set of discontinuous reception patterns and rules for selecting a discontinuous
reception pattern from the set to one or more user
devices via either a system information block or dedicated signaling;

receiving an indication of one or more selected discontinuous reception patterns from one or more user
devices; and allocating resources to the one or more user devices for
either sidelink transmission or uplink/downlink transmission based on received indication of one or more
selected discontinuous reception pattern from the one
or more user devices.

According to a seventh aspect there is provided an apparatus comprising means for:

obtaining a set of discontinuous reception patterns and
rules for selecting a discontinuous reception pattern for
sidelink communication from a network control entity
or an operations and maintenance manager;

providing information of the set of discontinuous reception patterns and rules for selecting a discontinuous
reception pattern from the set to one or more user
devices via either a system information block or dedicated signaling;

receiving an indication of one or more selected discontinuous reception patterns from one or more user
devices; and allocating resources to the one or more user devices for
either sidelink transmission or uplink/downlink transmission based on received indication of one or more
selected discontinuous reception pattern from the one
or more user devices.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME
EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

A radio device may be a device configured for communications on radio waves over a wireless radio link, i.e. a wireless link. The communications may comprise user traffic and/or signaling. The user traffic may comprise data, voice, video and/or audio. Examples of the wireless link comprise a point-to-point wireless link and a point-to-multipoint wireless link. The wireless link may be provided between two radio devices. It should be appreciated that the radio devices may have differences. For example, radio devices connected by a wireless link may comprise one or more of a user equipment (UE), an access node, an access point, a relay node, a user terminal and an Internet of Things (IoT) device.

A radio device may be a radio access device that is configured to serve a plurality of other radio devices, user radio devices, and give radio access to a communications system for the user radio devices. A radio device may also be a radio station serving as relay node or providing a wireless backhaul for one or more radio access nodes. Examples of the radio access devices comprise at least an access node, an access point, a base station and an (e/g) NodeB. Examples of the user radio devices comprise at least a user terminal and user equipment (UE). The radio device may be an aerial radio device and/or an extraterrestrial radio device configured to operate above the ground without a fixed installation to a specific altitude. Examples of extraterrestrial radio devices comprise at least satellites and spacecraft that are configured for radio communications in a communications system that may comprise both terrestrial and extraterrestrial radio devices. Examples of aerial radio devices comprise at least High Altitude Platform Stations (HAPSs) and unmanned aerial vehicles (UAVs), such as drones. The radio access device may have one or more cells which the user radio devices may connect to in order to access the services of the communications system via the radio access device. The cells may comprise different sizes of cells, for example macro cells, micro cells, pico cells and femto cells. A macro cell may be a cell that is configured to provide coverage over a large coverage area in a service area of the communications system, for example in rural areas or along highways. A micro cell may be a cell that is configured to provide coverage over a smaller coverage area than the macro cell, for example in a densely populated urban area. Pico cells may be cells that are configured to provide coverage over a smaller area than the micro cells, for example in a large office, a mall or a train station. Femto cells may be cells that are configured to provide coverage over a smaller area than the femto cells, for example at homes or small offices. For example, macro cells provide coverage for user radio devices passing a city on a motorway/highway and local cells, e.g. micro cells or smaller cells, provide coverage for user radio devices within the city. In another example, macro cells provide coverage for aerial radio devices and/or extraterrestrial radio devices and local cells, e.g. micro cells or smaller cells, provide coverage for the aerial radio devices and/or extraterrestrial radio devices that are located at elevated positions with respect to one or more radio access devices of the communications system. Accordingly, an aerial radio device or extraterrestrial radio device may be connected to a micro cell of a radio access device and when the aerial radio device or extraterrestrial radio device is above a certain height from the ground, the aerial radio device or extraterrestrial radio device may be switched to a macro cell, for example by a handover procedure.

Figure 1:
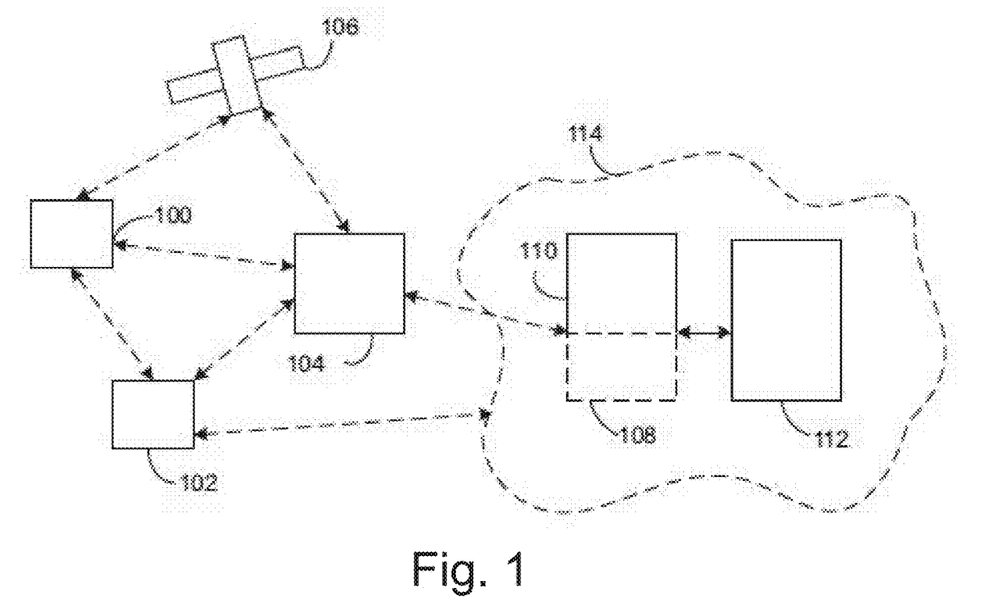
FIG. 1 shows a part of an exemplifying wireless communications access network in accordance with at least some embodiments of the present invention.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHZ, cm Wave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHZ-cm Wave, below 6 GHZcmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, an operations and maintenance manager, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(c/g)NodeBs), a home node B gateway, or HNB-GW (not shown in FIG. 1). A HNB Gateway (HNB-GW), which is typically installed within an operator's network may aggregate traffic from a large number of HNBs back to a core network.

The embodiments are not, however, restricted to the system given as an example but a person skilled in the art may apply the solution to other communication systems provided with necessary properties.

The nature of the sidelink (SL) is oriented according to a transmitting user equipment (Tx UE) wherein a receiving user equipment (Rx UE) may need to keep monitoring all possible PSCCH (Physical Sidelink Control Channel) instances to receive sidelink transmission over one or more preconfigured resource pool(s). There are at least the following two allocation modes for sidelink transmissions. The first mode, Mode 1, is a base station (BS) scheduled mode in which the serving base station allocates resources for the user equipment for sidelink transmission, and the second mode, Mode 2, is an autonomous UE selected mode, in which the user equipment may allocate resources for the sidelink transmission without base station intervention. These modes make no difference to a receiving user equipment Rx UE in term of receiving sidelink, regardless of whether the sidelink is for broadcast, groupcast or unicast. The sidelink can be applied for both in-coverage and out-of-coverage situations with multi-PLMN support (Tx UE and Rx UE from different serving PLMNs).

In public safety or road safety use cases, sidelink communication is often used for groupcast or broadcast in connectionless manner. Hence, a receiving user device (Rx UE) may need to listen to various transmitting user devices (Tx UEs) in proximity without knowing in advance which transmitting user devices may be present in proximity. Thus, possible discontinuous reception (DRX) operation for the receiving user device needs to cope with various and random transmitting user devices present in proximity. The transmitting user device, on the other hand, may not know or care about presence of any particular receiving user devices in proximity. This may make discontinuous reception operation specific to individual receiving user device rather impractical.

In connection-oriented unicast and groupcast use cases, discontinuous reception operation specific to individual receiving user devices over sidelink may be agreed beforehand between the receiving user device and the transmitting user device. Considering sidelink supports for low-power wearable devices or relaying user devices in general, hosting or relaying user device may be acting as a common coordinating point for DRX operation of all receiving user devices being connected to or served by the same hosting or relaying user device.

In the above use cases, the receiving user device may become a transmitting user device as well as switch to Uu (air interface) for network access from time to time and therefore capability limitations of the user device and/or half-duplexing issues may need to be considered.

Furthermore, the following factors may have a direct impact on the need and/or priority for DRX operation of the receiving user device:

Rx UE may be in different statuses of the mobile battery power, e.g., low, mid, high.

Rx UE may experience different SL channel conditions as well as synch timings towards different Tx UEs because Tx UEs may come from different serving carriers or PLMNs, network-coverage statuses, etc., even for the same service.

Rx UE may have different services towards different Tx UEs over SL as well as serving BS over Uu.

Taking all the above listed observations and impacting factors into considerations, letting either the transmitting user device or the receiving user device determine the semi-static ON-OFF pattern for DRX operation of individual receiving user device over sidelink on-the-fly may not be practical in general, as there may be a need to coordinate among either all receiving user devices of the same transmitting user device or all transmitting user devices of the same receiving user device over the sidelink. This coordination may be rather cumbersome or extensive (scaled up with the number of involved transmitting and receiving user devices), as the transmitting user devices or the receiving user devices as well as the numbers thereof may be changing dynamically depending on use cases as well as UE contexts including service profiles, statuses or conditions.

In the following, there is described, in accordance with an embodiment, a method using network configuration of semi-static ON-OFF patterns corresponding to supported combinations of predefined use cases, service profiles, statuses and/or conditions of user devices or classes of user devices for sidelink discontinuous reception for in-coverage operation or pre-configuration for out of coverage operation as the bases. This is also kept in line with the resource pool configuration and resolution for at least sidelink reception, common to all relevant user devices. That is, Rx UE in DRX is configured to monitor by a physical sidelink control channel (PSCCH) to receive SL over a sub-pool derived from the selected ON-OFF pattern and the corresponding configured pool. Thus, extensive coordination between relevant Tx UE(s) and Rx UE(s) to determine and agree on an ON-OFF pattern for DRX operation can be avoided.

The term ON-OFF pattern refers to the time when a receiver of the user device is able to receive i.e. is in a reception mode (e.g. switched on) and the time when the receiver is not in the reception mode (e.g. switched off). The ON-OFF pattern may be repeated sequentially unless changed to another pattern or temporarily interrupted, for example in a situation in which there is still data to be transmitted during a current on-period and the time reserved for the on-period is ending.

Figure 3:
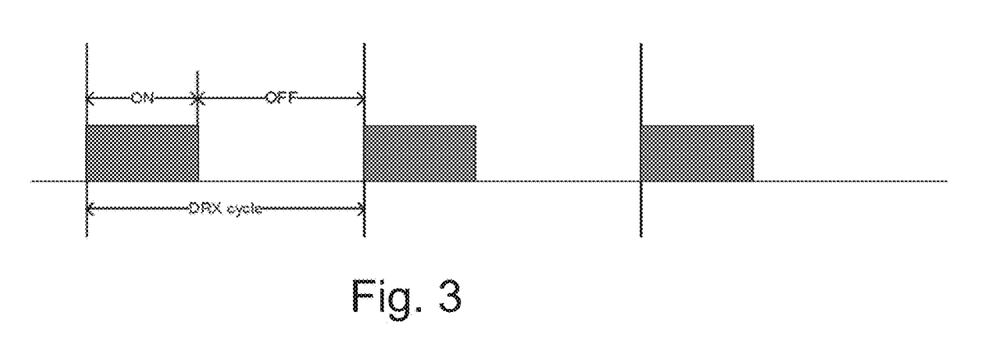
FIG. 3 illustrates an example of an ON-OFF pattern for discontinuous reception in sidelink communication.

An example of an ON-OFF pattern for DRX is illustrated in FIG. 3. The ON period illustrates the time when a receiver of a user device is enabled (e.g. switched on, powered on) to receive transmissions from other equipment such as from another user device and/or from a base station. The OFF period illustrates the time when the receiver of the user device is disabled (e.g. switched off, powered off) to receive transmissions from other equipment such as from another user device and/or from a base station. The DRX cycle illustrates the total length (time) of the DRX period, i.e. the length of one ON period and the OFF period.

In the following, the ON-OFF pattern is also called as a timing pattern or a reception enablement-disablement pattern or a discontinuous reception pattern or a DRX pattern for short.

The DRX patterns may be called semi-static DRX patterns, meaning that when selected, the DRX pattern indicates how long the DRX period is and within the DRX period, how long the ON period is and how long the OFF period is. However, after the selection the length of the ON period and/or the length of the OFF period may be changed if some conditions so indicate. The change may be reversible or irreversible, until a next selection of the DRX period, if any, is made.

Figure 2:
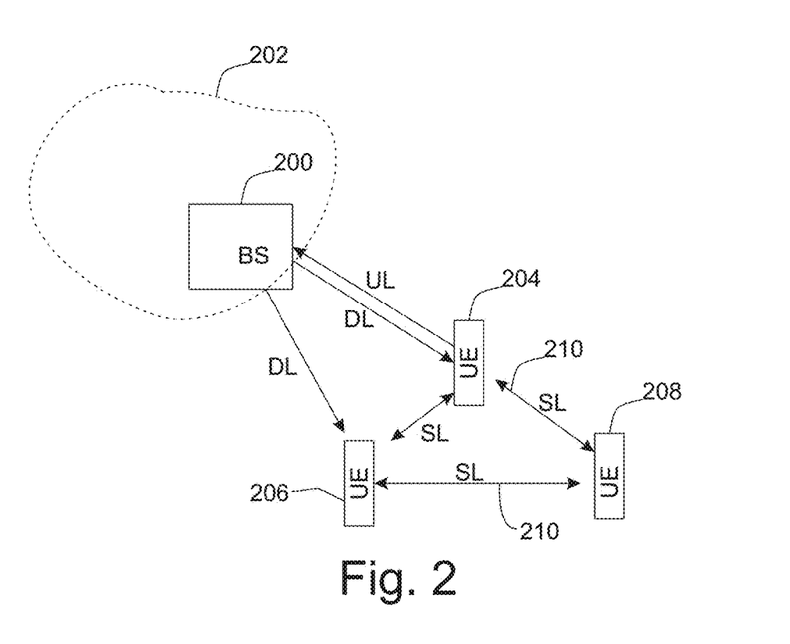
FIG. 2 illustrates an example of a communication setup in which some embodiments may be implemented.

FIG. 2 illustrates an example of a communication setup in which some embodiments may be implemented. There is a base station 200 which may operate as an access point to a communication network 202 by user devices 204, 206, 208. The user devices 204, 206, 208 have wireless communication capability with other user devices and/or the base station. In the setup of FIG. 2 one user device 204 is acting as a relay between some other user devices 206, 208 and the base station 200, for example. However, some of the user devices 204, 206, 208 may also be able to have a direct, mutual communication connection without any relaying user device or the base station. In the example of FIG. 2 the second user device 206 and the third user device 208 are communicating with each other whereas the first user device 204 is communicating with the base station 200, the second user device 206 and the third user device 208.

User devices having direct connection with each other may use a sidelink connection 210, for example.

In the illustration of FIG. 2, the user device 204 is communicating with the base station 200 by using both a downlink (DL) and uplink (UL) whereas the user device 206 is communicating with the base station 200 by using only the downlink (DL) i.e. is only receiving signals from the base station 200 and communicates with two other user devices 204, 208 via the sidelink. The user device 208 is communicating with the user devices 204 and 206 via the sidelink only, but the user device 204 which is able to communicate with the base station 200 may forward messages from the other user devices 206, 208 to the base station 200 and may forward messages from the base station 200 to the other user devices 206, 208.

It may also be possible that a user device is able to receive signals from a base station, but signals transmitted by that user device may not be received by the base station. This may be due to higher transmission power available by the base station than the transmission power of the user device. In this kind of situation, the user device may receive e.g. control information from the base station (via downlink, DL) and transmit replies and data to a relaying user device utilizing sidelink communication with the relaying user device, for example.

In the following, some examples embodiments will be described with reference to the flow diagram of FIG. 4, the signaling diagram of FIG. 5 for interactions between user equipment over sidelink and between user equipment and a serving network, and the system setup of FIG. 2.

One or more predetermined sets of different reception enablement-disablement patterns are defined. Each of the predetermined sets of different reception enablement-disablement patterns may comprise one or more different reception enablement-disablement patterns. In accordance with an embodiment, a method for selection of a DRX pattern may comprise selection of one set among the one or more sets and if the selected set comprises more than one DRX pattern, selecting one of the DRX patterns from the selected set of DRX patterns.

The selection of the DRX pattern may be performed, for example, as follows.

The user device (a relevant user device, relevant UE) obtains (block 401 in FIG. 4) e.g. by receiving from the serving network (as in in-coverage operation) or from another user device (as in relaying operation) or retrieving from a memory of the user device (as in out-of-coverage operation, for example from a subscriber identification module or another storage circuitry), a set of pre-defined semi-static ON-OFF patterns for SL DRX. The user device is then configured by the serving network with a set of pre-defined semi-static ON-OFF patterns for SL DRX, either as a pre-configuration for out-of-coverage situation or as a cell-specific or an area-specific configuration via either a transmission of a system information block (SIB) carrying system information (SI) or dedicated signaling for in-coverage situation by the serving network. Each of the configured ON-OFF patterns is assigned with a unique identifier (ID), corresponding to a specified combination of use case, service profile, status and/or condition known to the relevant user device. For example, there may be different ON-OFF patterns specified for different targeted use cases and/or service profiles (application/service profiles) such as road-safety messaging services for VRU UE (vulnerably road user device), mission-critical voice group call and multimedia messaging services for public-safety UE, multimedia messaging services for low-power sensor-based wearable UE, network access services for relayed UE, etc. There may be different subsets (or adjustment offsets) of ON-OFF patterns (or periods specified) for different statuses of remaining mobile battery power or operational lifetime thereof, reflecting different critical levels or priorities of the need for power saving. There may be different subsets (or adjustment offsets) of ON-OFF patterns (or ON-OFF periods) specified for different configured resource pools and/or different channel busy rates (CBR) or load conditions of corresponding resource pools or carriers. For example, when a user device notices that an operational lifetime of a battery of the user device drops below a threshold, the user device may select another DRX pattern of the same ongoing use case and/or service profile if available (as the user device may be configured or preconfigured with one or more DRX patterns per a supported use case and/or service profile corresponding to different predefined ranges of the mobile battery status), aiming to reduce the power consumption of the user device.

The relevant user device may be configured to select (402) the right ON-OFF pattern for the needed or supported DRX over SL, depending on its targeted application/service and status/condition as well as received indications of selected ON-OFF pattern ID from other relevant user devices in proximity as will be described below. This may either be an autonomous selection by the user device or an enforced control by a serving base station or associated hosting or relaying user device, for example.

The relevant user device may be configured to align the use of DRX as well as the timing of the selected ON-OFF pattern with other relevant user devices in proximity, in line with the use of corresponding configured or preconfigured resource pool(s). For example, all individual user devices of a targeted sidelink groupcast service (all members of a public safety user group having a mission critical voice group call or messaging) may select a DRX pattern configured for the sidelink groupcast service and need to keep the DRX operation in synch with each other in proximity for the groupcast service. Therefore, the relevant user device may be configured to indicate (403) the ID of the selected ON-OFF pattern over SL to other relevant user devices in proximity. This may be enforced by the serving network to at least those relevant user devices which are acting as synchronization sources for sidelink, hosting or relaying user devices. It is noted that these enforced user devices may not be in the need of DRX but rather in support of DRX for other user devices connected to them, e.g., in case of supporting wearable devices for example. It is further noted that the relevant user device may be equally active in reception (Rx) and transmission (Tx) in case of group communication for public safety or more active in transmission and less active in reception in case of a vulnerable road user device, for example. The relevant user device may be configured to indicate the selected ON-OFF pattern to the serving BS so that, for examples, the serving BS may be able to respect the DRX operation of the user device over sidelink while allocating resources for sidelink transmission or scheduling UL/DL transmission for the user device. The relevant user device may be configured to indicate the critical level of power saving and/or required QoS (Quality of Service) (corresponding to targeted adjustment of ON-OFF periods) separately from the ID of the selected ON-OFF pattern. This may be based, for example, on the following options:

(i) Critical power saving need, e.g., due to either low status of mobile battery or high-power consumption for ongoing services;

(ii) Critical half-duplexing issue due either its own need to transmit on SL or switch to Uu;

(iii) Critical service such as high priority service or ultra-reliable low-latency communication (URLLC) (collision should be avoided by means of resource allocation).

Figure 4:
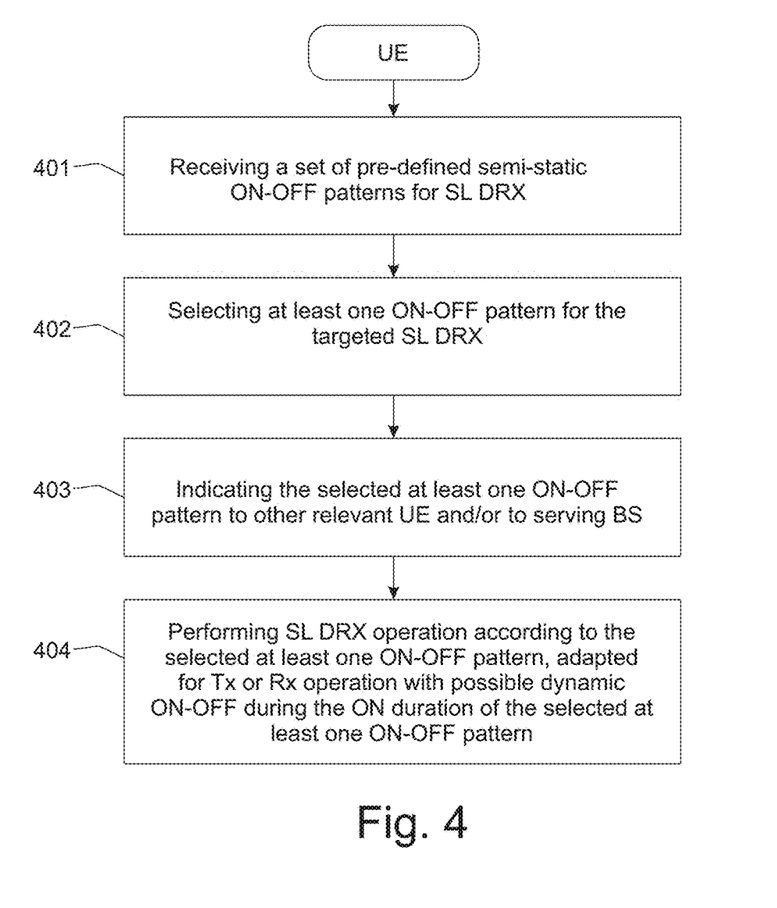
FIG. 4 depicts a flow diagram of a method, in accordance with an embodiment.

The relevant user device, when acting as a transmitting user device, adapts SL transmissions based on the selected ON-OFF pattern applied for the service corresponding to the SL transmissions coupled with received indications of the selected ON-OFF pattern and/or critical level of power saving from other relevant user devices in proximity (block 404 in FIG. 4).

The adaptation may be considered as a part or outcome of the alignment of the selected DRX pattern among relevant user devices in proximity. If there are different or multiple DRX patterns selected and indicated by different individual relevant user devices for the same service profile or different service profiles, the transmitting user device may adapt SL transmission to the indicated different or multiple DRX patterns either during overlapping ON period, if such period can be found, or by multiple repetition of the same SL transmission during the ON period of each indicated DRX pattern for different relevant UEs. This is because: (i) one user device may select more than one (multiple) DRX patterns for more than one (multiple) services over SL with one or more other user devices; and (ii) different user devices may select different DRX patterns, if predefined and configured, for the same service over SL with one or more other user devices depending on their statuses/conditions.

The adaptation may trigger a relevant transmitting user device to request Mode 1 resources for SL transmissions to other relevant user devices adaptively according to the received indications of ON-OFF patterns of other relevant user devices. For instance, the transmitting user device may request from the base station SL mode 1 SPS allocation according to ON-OFF patterns indicated by the relevant user devices in proximity. Thus, the transmitting user device may need to indicate to the serving BS the selected ON-OFF pattern as well as the received ON-OFF patterns from other relevant UEs in proximity to request a suitable Mode 1 resource allocation (RA).

The relevant user device, when acting as a transmitting user device, is configured to either follow the indicated ON-OFF pattern or dynamically extend ON period of the indicated ON-OFF pattern of relevant user devices based on indicated critical level of power saving and/or required QoS, etc. For instance, if a relevant user device indicates low power level or critical half-duplexing constrains for other transmission or non-critical QoS requirement along with selected ON-OFF pattern, the transmitting user device may fully follow the indicated ON-OFF pattern for SL transmission even if there are still some data left for transmission after ON period ends. Otherwise, if the transmitting user device identifies the need and/or possibility for extending the ON period of the current DRX cycle due to e.g. critical service with stringent QoS and/or non-critical situation in relevant receiving user devices in term of power level or half-duplexing issue, the transmitting user device may indicate next intended SL transmissions to other relevant user devices using the first-stage resource reservation SCI (sidelink control information) (applied also for scheduled exclusive Mode 1 resources and not just selected share Mode 2 resources) to trigger the relevant receiving user devices to extend the ON period of the current DRX cycle. This allows for the receiving user devices to determine dynamic ON-OFF during the ON duration of the selected ON-OFF pattern.

The relevant user device, when being in CONNECTED state, is configured to indicate to the serving base station the selected ON-OFF pattern over SL which is either selected by the relevant user device or based on received indication of the selected ON-OFF pattern over SL from other relevant user devices in proximity. This may be used by the serving base station to align DRX over Uu and DRX over SL as well as schedule Mode 1 resources for the user device or reconfigure resource pool(s) for relevant user devices.

That a relevant user device (belonging to a particular predefined class or group of user devices) may be configured with a common semi-static ON-OFF pattern, either selected by the user device or enforced to the user device by a serving BS or a hosting or relaying user device, for SL DRX implies that the relevant user device is configured to monitor, e.g., SCI on PSCCH to receive SL over a sub-pool of the configured overall Rx pool derived from the configured ON-OFF pattern. That is, some embodiments imply a flexible time-sharing resolution of configured SL resource pool(s) for different use cases, service profiles, statuses or conditions of relevant user devices without a need of an explicit sub-pool division and configuration to all relevant user devices for facilitating a support of DRX over SL for relevant user devices. The determination and coordination of DRX operation over SL is somewhat shifted to the serving network, instead of relying fully on a distributed determination and coordination among user devices. This is therefore more practical and controllable, in line with SL resource configuration and allocation.

In one embodiment, the network may coordinate and configure ON-OFF patterns for SL DRX across a validity area of multiple serving cells, along with SL resource pool configuration.

In one embodiment, the network may configure the user device not to follow the zone based spatial resolution of Mode 2 resources when having SL DRX, as the combination of the two may cause a shortage of transmission resources in Mode 2.

In one embodiment, the transmitting user device adapts its SL transmissions based on the most critical ON-OFF pattern received from other relevant receiving user devices in proximity. The transmitting user device may be allowed to extend ON period dynamically when still having more data to send by indicating next intended SL transmissions using a first phase of PSCCH regardless of whether the transmitting user device is using Mode 1 or Mode 2 resources. In an alternative or addition, the transmitting user device may send a request, in form of a MAC CE over SL for example, to extend the current ON period of a selected ON-OFF pattern to other relevant user devices.

In one embodiment, the network may define the set of ON-OFF patterns corresponding to supported QoS classes but not directly to use cases or applications. In this case, there may be a need for a common mapping rule between application(s)/service(s) and corresponding ON-OFF pattern so that the user device may select the right ON-OFF pattern for its application/service. In another option, the selection as well as coordination of ON-OFF pattern among relevant user devices may be shifted to the application layer, given that the application layer is informed of the predefined ON-OFF patterns supported by the access network. It is noted that there may be a need to indicate and align the selected one or at least a limited number of ON-OFF patterns by all relevant user devices in proximity. In case this indication of the selected ON-OFF pattern(s) is realized using the proximity discovery service over SL then even with the option of having the access layer (the serving network and the UE) to define and select ON-OFF pattern the application still needs to be informed of at least the selected ON-OFF pattern.

In one embodiment, the user device may have more than one selected ON-OFF pattern, as the user device may be active in more than one services with different other user devices or user device groups. In this case the user device may indicate a list of the individual selected ON-OFF patterns to other relevant user devices in proximity.

Figure 5:
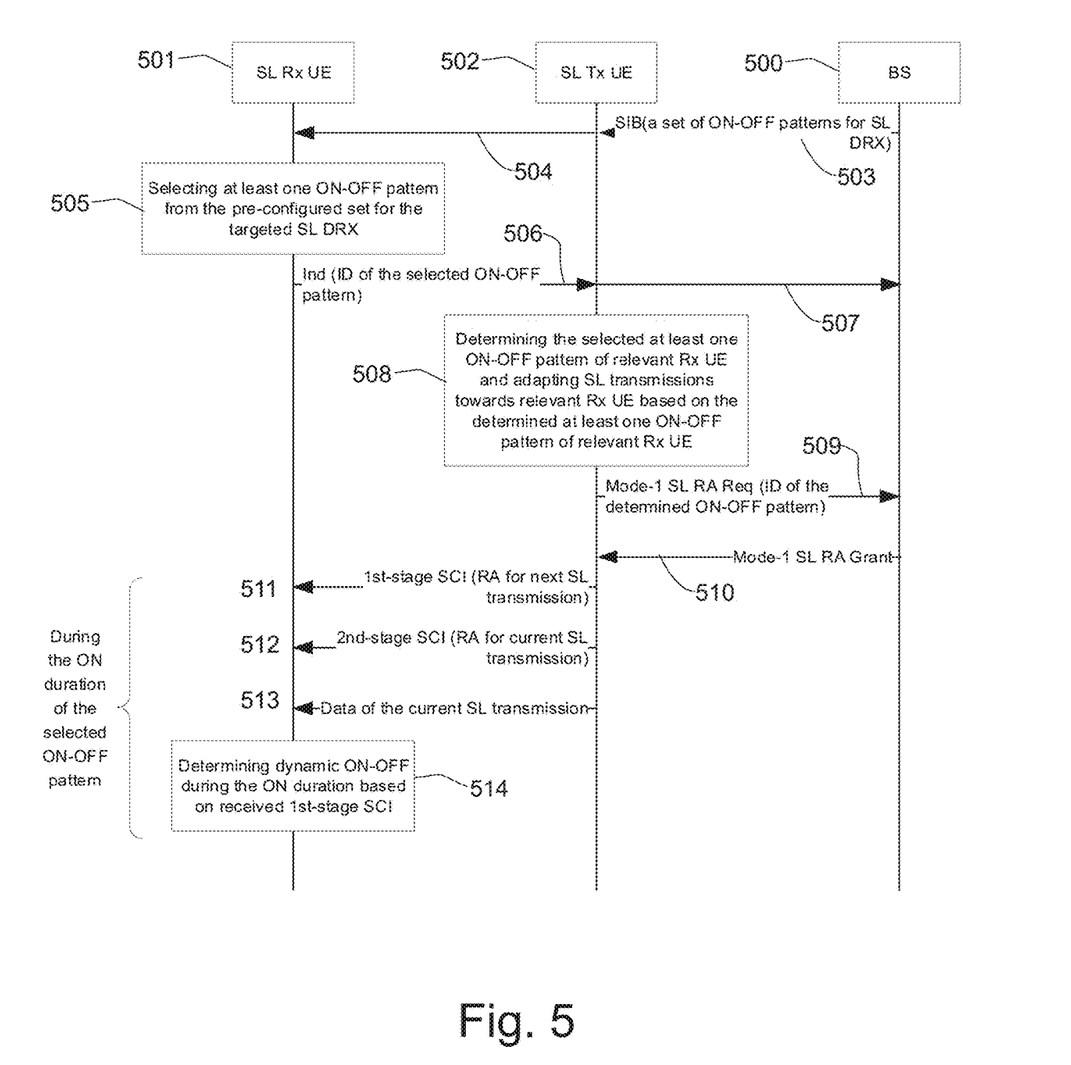
FIG. 5 depicts a signaling diagram for interactions between user equipment over sidelink and between user equipment and a serving network, in accordance with an embodiment.

FIG. 5 depicts a signaling diagram for interactions between user equipment over sidelink and between user equipment and a serving network, in accordance with an embodiment. The base station 500 sends a preconfigured set of ON-OFF patterns for SL DRX in the SIB message broadcast to all relevant user devices residing in radio coverage of the base station including a SL-peer transmitting user device (SL Tx UE) 502 and a SL-peer receiving user device (SL Rx UE) 501 (arrows 503-504 in FIG. 5). The user device 501 received the SIB message and selects 505 at least one ON-OFF pattern from the preconfigured set for the targeted SL DRX. The user device 501 sends 506 an indication of the selected ON-OFF pattern in an indication message (Ind) to other relevant user devices in proximity including the SL-peer transmitting user device 502. In 507 the user device 501, as it may become Tx UE from time to time for the ongoing communication service over SL with other SL-peer user devices in proximity, may indicate the selected ON-OFF pattern to the base station 500 in advance. The transmitting user device 502 determines the selected at least one ON-OFF pattern of the relevant user device, the receiving user device 501, and adapts SL transmissions towards the relevant user device 501 based on the determined at least one ON-OFF pattern of the relevant user device 501 (block 508 in FIG. 5). The transmitting user device 502 sends 509 a request for mode 1 resources for SL transmissions to the base station 500. The request includes the indication of the selected set of ON-OFF patterns based on the received indication(s) of selected ON-OFF pattern(s) from relevant user device(s) including the receiving user device 501. If the base station 500 grants the requested resources, the base station 500 sends 510 a Mode 1 SL resource allocation (RA) Grant message to the transmitting user device 502. The transmitting user device 502 may then send three messages to the user device 501: a 1st stage SCI indicating the RA (the granted Mode 1 resources in this example) to reserve for the next SL transmission, arrow 511; a 2nd stage SCI indicating the RA (the granted Mode 1 resources in this example) for the current SL transmission, arrow 512; and data of the current SL transmission, arrow 513. During the transmission of these three messages the user device 501 is in the ON state. The user device 501 determines 514 dynamic ON-OFF during the ON duration based on the received 1st stage SCI.

In some use cases (e.g. commercial, mission critical group communications or VRU) either user device discovery procedure may be needed for relevant user devices or relevant user devices are grouped/classified beforehand.

It should be noted that a VRU such as a PUE in LTE do not need to receive at all. In 5G, if a VRU should receive SL to a limited extent, this could be performed, for example, so that all VRUs are configured to use a single DRX pattern of, said 10 ms ON and 90 ms OFF over 100 ms DRX cycle (DRX is OFF for 90% of the time). This DRX pattern of VRU is also preconfigured/indicated to all other relevant V-UEs so that messages targeted to VRU from V-UEs should be sent to them in ON period of VRU. There is no need for the VRU to indicate anything over SL here. This is applied for other class of UEs as well if there is only one preconfigured DRX pattern applied for them.

In the following, some non-limiting examples of ON-OFF patterns (also called as discontinuous reception patterns) for the sidelink DRX are provided:

a first sub-set with 1 pattern: DRX cycle of 20 ms and ON-OFF periods of 10+10 ms suitable for delay-critical real-time services with 50% OFF for power saving;

a second sub-set with 2 patterns: DRX cycle of 40 ms and ON-OFF periods of 10+30 and 20+20 ms for real-time services with 2 options: 75% and 50% OFF for power saving;

a third sub-set with 5 patterns: DRX cycle of 100 ms and ON-OFF periods of 10+90, 20+80, 30+70, 40+60, 50+50 ms for messaging services with 5 options: 90% to 50% OFF for power saving.

It is rather flexible to define such the ON-OFF patterns suitable for a wide range of supported use cases and power saving demands without a need of having a large set or high number of such the patterns.

Figure 6:
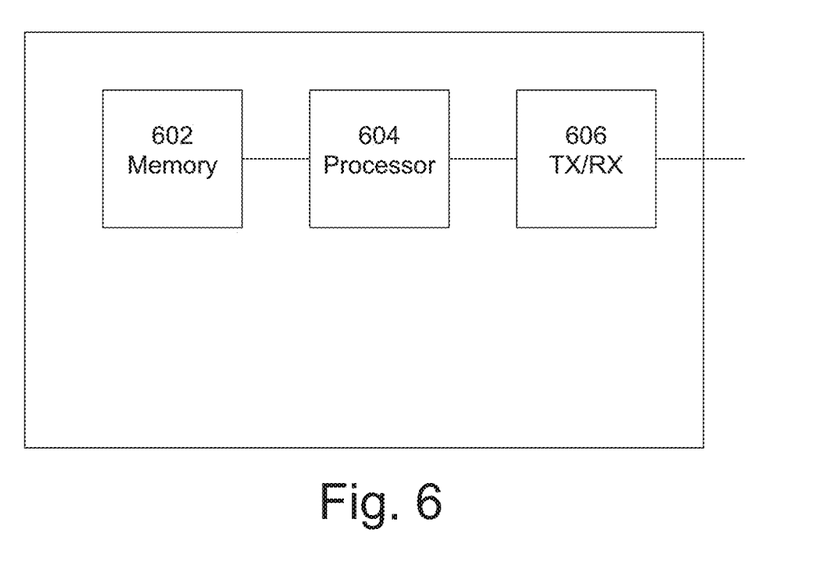
FIG. 6 illustrates an apparatus in accordance with an embodiment.

FIG. 6 illustrates an example of an apparatus in accordance with at least some embodiments of the present invention. The apparatus may be a radio device, for example a radio access node or a user radio device. The apparatus may perform one or more functionalities according to examples described herein.

The apparatus comprises a processor 602 and a transceiver 604. The processor is operatively connected to the transceiver for controlling the transceiver. The apparatus may comprise a memory 606. The memory may be operatively connected to the processor. It should be appreciated that the memory may be a separate memory or included to the processor and/or the transceiver.

According to an embodiment, the processor is configured to control the transceiver to perform one or more functionalities described according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a user radio device, UE, radio access device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a radio station, in a user radio device, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment (UE), comprising:
at least one processor; and
at least one non-transitory memory storing instructions, that when executed by the at least one processor, cause the UE at least to:
obtain two or more pre-defined semi-static ON-OFF patterns of discontinuous reception patterns for a wireless communication device to be used in sidelink communication with one or more user devices, wherein each of the semi-static ON-OFF patterns is assigned with a unique identifier corresponding to a specific combination of at least one of predefined use case or service profile of the UE, the semi-static ON-OFF patterns indicating how long a discontinuous reception period is and within the discontinuous reception period, how long the ON period is and how long the OFF period is, and wherein after the selection, the length of the ON period and the length of the OFF period are changed based upon a condition, wherein the two or more pre-defined semi-static ON-OFF patterns of discontinuous reception patterns are received from a base station;
use the obtained information to determine which one of the two or more semi-static ON-OFF patterns has a closest correspondence with the at least one of targeted service profile or use case of the UE;
select said one of the two or more pre-defined semi-static ON-OFF patterns which has the closest correspondence with the at least one of targeted service profile or use case of the UE;
wherein at least one of receive signals from the one or more other devices or transmit signals to the one or more other devices for the sidelink communication is according to the selected one of the two or more pre-defined semi-static ON-OFF patterns;
indicate an identifier of the selected one of the two or more pre-defined semistatic ON-OFF patterns to the base station; and
indicate the selected one of the two or more pre-defined semi-static ON-OFF patterns of its own to the base station.

2. The UE according to claim 1, wherein the at least one non-transitory memory storing instructions is executed by the at least one processor, to cause the UE at least to:
provide an indication of the selected at least one discontinuous reception pattern to one or more other wireless communication devices.

3. The UE according to claim 1, wherein the one or more properties comprise at least one of a status of mobile battery power, a sidelink channel condition, or at least one service of the wireless communications device.

4. The UE according to claim 1, wherein the at least one non-transitory memory storing instructions is executed by the at least one processor, to cause the UE at least to:
obtain two or more sets of discontinuous reception patterns, wherein each of the two or more sets comprises one or more discontinuous reception patterns, wherein selecting the at least one discontinuous reception pattern comprises:
select a set from the two or more sets; and select the one or more discontinuous reception patterns from the selected set.

5. The UE according to claim 1, wherein the at least one non-transitory memory storing instructions is executed by the at least one processor, to cause the UE at least to:
examine whether the on period should be lengthened depending on whether an indication of resource reservation for more upcoming sidelink transmission from one or more other wireless communication devices is received or not, and if so, keep the receiver enabled to receive signals from other wireless communication devices until the lengthening of the on period is no more needed.

6. The UE according to claim 1, wherein the at least one non-transitory memory storing instructions is executed by the at least one processor, to cause the UE at least to perform at least one of:
   sending an indication of the selected discontinuous reception pattern to one or more other user device; or
   receiving the indication of the selected discontinuous reception pattern from one or more other user device.

7. The UE according to claim 1, wherein the at least one non-transitory memory storing instructions is executed by the at least one processor, to cause the UE at least at least one of:
   send information of the one or more properties identifying the at least one of a targeted service profile or a use case of the UE; and
   receive information of the one or more properties which is used for identifying based on the at least one of a class or group a need or priority for discontinuous reception operation of the discontinuous reception pattern from one or more other user device.

8. The UE according to claim 1, wherein the at least one memory storing instructions is executed by the at least one processor, to cause the UE at least to:
   indicate a resource reservation for more upcoming sidelink transmission to one or more other user devices.

9. The UE according to claim 1, wherein the UE is at least one of a receiving user device or a transmitting user device.

10. A method, comprising:
   obtaining, by a user equipment (UE), two or more pre-defined semi-static ON-OFF patterns of discontinuous reception patterns for a wireless communication device to be used in sidelink communication with one or more user devices, wherein each of the semi-static ON-OFF patterns is assigned with a unique identifier corresponding to a specific combination of at least one of pre-defined use case or service profile of the UE, the semi-static ON-OFF patterns indicating how long a discontinuous reception period is and within the discontinuous reception period, how long the ON period is and how long the OFF period is, and wherein after the selection, the length of the ON period and the length of the OFF period are changed based upon a condition, wherein the two or more pre-defined semi-static ON-OFF patterns of discontinuous reception patterns are received from a base station;
   obtaining, by the UE, information of at least one of a targeted service profile or a use case of the UE;
   using, by the UE, the obtained information to determine one of the two or more pre-defined semi-static ON-OFF patterns has a closest correspondence with the at least one of targeted service profile or use case of the UE; and
   selecting, by the UE, said one of the two or more pre-defined semi-static ON-OFF patterns which has the closest correspondence with the at least one of targeted service profile or use case of the UE;
   wherein at least one of receiving signals from the one or more other devices or transmitting signals to the one or more other devices for the sidelink communication is according to the selected one of the two or more pre-defined semi-static ON-OFF patterns;
   indicating, by the UE an identifier of the selected one of the two or more pre-defined semi-static ON-OFF patterns to the base station; and
   indicating, by the UE, the selected one of the two or more pre-defined semi-static ON-OFF patterns of its own to the base station.

* * * * *